PULSE TIME MODULATION SIGNAL TRANSMISSION SYSTEM

Filed May 17, 1955

INVENTORS
Kojiro Kinoshita,
Ichiji Yasuda and
Hisashi Takakita,

BY Pierce, Scheffler & Parker
their ATTORNEYS 2,825,028

PULSE TIME MODULATION SIGNAL TRANSMISSION SYSTEM

Kojiro Kinoshita, Ichiji Yasuda, and Hisashi Fukukita, Tokyo, Japan, assignors to Japan Broadcasting Corporation, Chiyoda-ku, Tokyo, Japan Application May 17, 1955, Serial No. 508,984

4 Claims. (Cl. 332—9)

This invention relates to a signal transmission system using pulse time modulations, and more particularly to a pulse time modulation signal transmission system which is characterized in that a grid potential of a self-excited oscillator is modulated by a modulator and the oscillation of superaudio frequency caused by an independent auxiliary oscillator is superposed on said self-excited oscillator.

The principal object of this invention is to provide a signal transmission system which can minimize noises which are unavoidable when a self-excited oscillator is directly pulse time modulated.

Another object of this invention is to provide the simplest construction to carry out such system smoothly.

In the case of signal transmission in high frequency band such as above 1000 megacycles per second the power amplification is very difficult so that it has been usual to directly modulate a self-excited oscillator of high power at high power level.

However in the case of time modulation there occur in modulated pulses noises caused by the modulated oscillator itself and also random noises from external circuits. Such noises become the initial voltage in building up an oscillation and they affect the starting time of oscillation of the modulated oscillator so that disadvantageous and undersirable noises are caused when the pulse modulated electric wave is demodulated.

This invention is based on the recognition of the fact that the undesirable noises appearing in the demodulated wave are due to the noise caused by thermal agitation of the oscillation circuit and that induced in the oscillation circuit from the external circuit, and that their adverse effects can be removed by giving the "seed" of frequency of superaudio oscillation to said oscillation circuit.

In carrying out this invention into effect, an auxiliary oscillator of superaudio frequency of comparatively low power output is coupled to a modulated oscillator. This auxiliary oscillator, called a "seed oscillator," provides sufficient signal level to ensure the starting time of oscillations substantially independent of any random noise variation. It was found by experimentation that the frequency of the seed oscillator may deviate considerably from that of the pulse-modulated oscillator without causing appreciable change in performance.

Figures 1, 2:
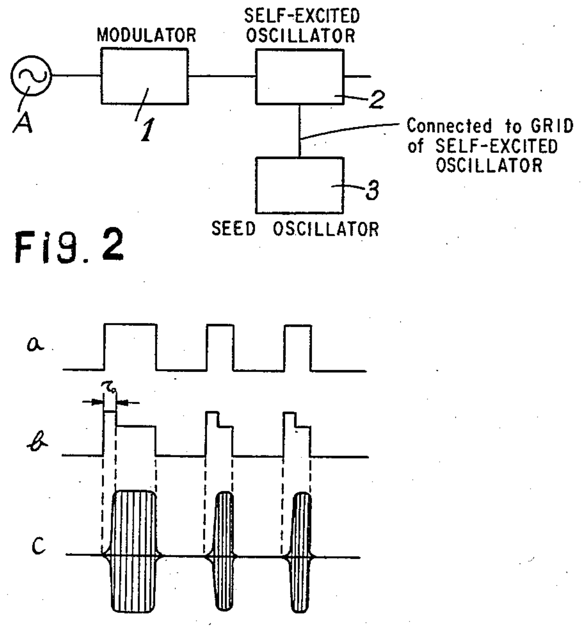
Figure 3:
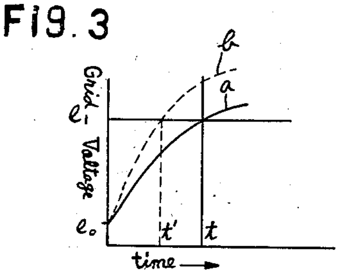

For a better understanding of this invention, reference is taken to the accompanying drawings, in which Fig. 1 is a simplified block diagram showing an embodiment of this invention, Figs. 2–*a*, *b* and *c* are curves taken for explanation of the operation of this invention, and Fig. 3 are curves showing the relation between the degree of back coupling, the initial grid voltage $e_0$ and the voltage $e_1$ after $t$ second.

Referring to Fig. 1, A represents a source of electricity, 1 is a modulator and 2 is a self-excited oscillator. According to this invention, the grid potential of the self-excited oscillator is modulated by the modulator 1 and an auxiliary oscillator called the "seed oscillator" 3 is provided near the modulated oscillator 2 to be coupled thereto. The frequency of the auxiliary oscillator 3 is selected to be almost equal to or in harmonic relation to the frequency of the oscillator 2, but generally speaking it may be of superaudio frequency which would not give adverse effects to the demodulated signals. Though the frequency of the oscillator 3 needs not be strictly limited to the above extent, yet it is advantageous to select the frequency to the above value since the voltage induced in the oscillator 2 by the oscillator 3, even if it is small, is stepped up in the circuit of the oscillator 2. The voltage of the seed oscillator 3 may be applied in series to the grid circuit of the oscillator 2.

Referring to Fig. 2–*a*, the curve represents the output voltage wave form of modulator 1, and Fig. 2–*b* represents the grid voltage wave form of modulated oscillator 2, and Fig. 2–*c* illustrates the ouput curve of the modulated oscillator 2.

As apparent from Fig. 2–*b*, if the "seed" is not supplied to the modulated oscillator 2 from the "seed oscillator" 3, the oscillation will start with the lag $\tau_0$ behind the modulating pulse, but if the seed is introduced the lag $\tau_0$ is considerably reduced and both average plate current and grid current increase so an indication is provided of whether or not the oscillator 2 is operating favourably. This oscillator repeats steep start and stop of high frequencies by the pulse so that its frequency characteristics should be flat over the range of several hundred cycles to a few megacycles per second. Accordingly it is advantageous to use grid modulation according to this invention in such manner that the grid bias voltage of the oscillator 2 is selected to a sufficiently negative point of built-up character of the oscillator and the modulated pulse is applied in the positive direction to the grid of this oscillator to start it.

The building-up of an oscillation is roughly expressed by the following equation:

$$e_1 = e_0 \epsilon^{\delta t}$$

where $\epsilon$ is the base of natural logarithm, $e_0$ the initial voltage, $\delta$ the degree of back coupling of oscillator 2, $e_1$ the voltage at the time $t$.

Thus $$t = \frac{1}{\delta} \log_\epsilon \frac{e_1}{e_0}$$

$$\therefore \Delta t = -\frac{\Delta e_0}{\delta e_0}$$

In order to decrease the variation $\Delta t$ of the time due to the variation of the initial grid voltage $e_0$, the degree of back coupling of the oscillator circuit as well as the initial voltage should be increased. The increasing of back coupling accelerates the building-up of oscillation, but it is necessary to maintain the negative bias of the grid of oscillator 2 sufficiently large so as not cause unmodulated oscillations, and also the modulating pulse should be sufficiently augmented in order to obtain a required output.

As apparent from the foregoing description, according to the system of this invention the self-excited oscillator can be directly modulated without noise modulation and adverse effect of random noises so that the construction can be greatly simiplfied and needs no complicated and troublesome amplification in ultra short wave band as in usual modulated amplifiers.

What we claim is:

1. A system of pulse time modulation signal transmission comprising a modulator, a self-excited oscillator having a grid potential modulated by said modulator, and an independent auxiliary oscillator, said auxiliary oscillator producing a signal of superaudio frequency superposed on said self-excited oscillator.

2. A system of pulse time modulation signal transmission comprising a modulator, a self-excited oscillator having a grid potential modulated by said modulator, and an independent auxiliary oscillator, said auxiliary oscillator producing a signal having a frequency equal to the frequency of pulse modulated oscillation, said signal being superposed on said self-excited oscillator.

3. A system of pulse time modulation signal transmission as defined in claim 1, wherein the frequency of the auxiliary oscillator is a harmonic function of the frequency of the pulse modulated oscillation.

4. A system of pulse time modulation signal transmission comprising a modulator, a self-excited oscillator having a grid bias of such a value that the oscillator operates only when a signal pulse is applied to the grid, the grid potential of said oscillator being modulated by said modulator, and an independent auxiliary oscillator, said auxiliary oscillator producing a signal of superaudio frequency superposed on said self-excited oscillator.

References Cited in the file of this patent

UNITED STATES PATENTS 2,416,367 Young ---------------- Feb. 25, 1947